United States Patent
Reichert et al.

(10) Patent No.: US 10,086,931 B2
(45) Date of Patent: Oct. 2, 2018

(54) MULTICOPTER WITH WIDE SPAN ROTOR CONFIGURATION

(71) Applicant: Kitty Hawk Corporation, Mountain View, CA (US)

(72) Inventors: Todd Reichert, Mountain View, CA (US); Cameron Robertson, San Mateo, CA (US)

(73) Assignee: Kitty Hawk Corporation, Mountain View, CA (US)

( * ) Notice: Subject to any disclaimer, the term of this patent is extended or adjusted under 35 U.S.C. 154(b) by 34 days.

(21) Appl. No.: 15/249,077

(22) Filed: Aug. 26, 2016

(65) Prior Publication Data

US 2018/0057155 A1    Mar. 1, 2018

(51) Int. Cl.
| | | |
|---|---|---|
| B64C 27/08 | (2006.01) | |
| B64C 25/54 | (2006.01) | |
| B64D 11/06 | (2006.01) | |

(52) U.S. Cl.
CPC .............. *B64C 27/08* (2013.01); *B64C 25/54* (2013.01); *B64D 11/0689* (2013.01)

(58) Field of Classification Search
CPC ... B64C 27/08; B64C 11/46; B64C 2201/024; B64C 2201/162
See application file for complete search history.

(56) References Cited

U.S. PATENT DOCUMENTS

| | | | |
|---|---|---|---|
| 2,196,946 A | 4/1940 | Handley | |
| 2,465,193 A | 3/1949 | Boyle | |
| 2,702,171 A | 2/1955 | Katzenberger | |
| 3,507,466 A * | 4/1970 | Fleur | B64C 25/56 244/100 A |
| 3,889,902 A | 6/1975 | Madet | |
| 4,356,787 A | 11/1982 | Harley | |
| 4,799,629 A * | 1/1989 | Mori | A61N 5/06 244/23 C |
| 4,848,702 A | 7/1989 | Riggins | |
| 5,277,383 A | 1/1994 | Tormakhov | |
| 6,254,032 B1 | 7/2001 | Bucher | |
| 6,293,491 B1 | 9/2001 | Wobben | |
| 6,446,910 B1 | 9/2002 | Knoll | |
| 6,592,073 B1 | 7/2003 | Meekins | |
| 7,159,817 B2 | 1/2007 | Vandermey | |
| 7,188,804 B1 | 3/2007 | Boetto | |
| 7,263,945 B2 | 9/2007 | Little | |
| 7,699,260 B2 | 4/2010 | Hughey | |
| 9,321,529 B1 * | 4/2016 | Jones | B64C 39/02 |
| 9,457,900 B1 * | 10/2016 | Jones | B64C 39/02 |
| 9,821,906 B1 * | 11/2017 | Roop | B64C 35/001 |
| 9,856,016 B2 * | 1/2018 | Mueller | B64C 13/24 |

(Continued)

FOREIGN PATENT DOCUMENTS

WO    WO2015145101    10/2015

*Primary Examiner* — Christopher P Ellis
(74) *Attorney, Agent, or Firm* — Van Pelt, Yi & James LLP

(57) ABSTRACT

A multicopter aircraft with a wide span rotor configuration is disclosed. In various embodiments, a multicopter as disclosed herein includes a fuselage and a plurality of rotors. The plurality of rotors includes inner rotors and outer rotors, with the inner rotors being substantially surrounded by the outer rotors or the fuselage. The inner rotors and the outer rotors may be tilted based at least in part on their arrangement in relation to the fuselage.

18 Claims, 4 Drawing Sheets

(56) References Cited

U.S. PATENT DOCUMENTS

| | | | |
|---|---|---|---|
| 9,873,486 B2 | 1/2018 | Jackson | |
| 9,944,386 B1 | 4/2018 | Reichert | |
| 2002/0125368 A1* | 9/2002 | Phelps, III | B64C 27/10 244/17.23 |
| 2003/0164424 A1 | 9/2003 | Smith | |
| 2006/0266881 A1* | 11/2006 | Hughey | B64C 27/08 244/17.23 |
| 2008/0302908 A1 | 12/2008 | Filipek | |
| 2009/0008499 A1* | 1/2009 | Shaw | B64C 27/20 244/17.23 |
| 2010/0032522 A1 | 2/2010 | Zadini | |
| 2010/0044506 A1 | 2/2010 | Smith | |
| 2010/0066158 A1 | 3/2010 | Hamilton | |
| 2011/0226892 A1* | 9/2011 | Crowther | B64C 1/30 244/17.23 |
| 2011/0248118 A1 | 10/2011 | Meekins | |
| 2012/0083945 A1* | 4/2012 | Oakley | B64C 27/08 701/2 |
| 2013/0075538 A1 | 3/2013 | Wiplinger | |
| 2013/0105628 A1* | 5/2013 | Buscher | B64C 39/024 244/119 |
| 2013/0174768 A1 | 7/2013 | Von Der Goltz | |
| 2014/0252165 A1 | 9/2014 | Smith | |
| 2014/0261126 A1 | 9/2014 | Jenkins | |
| 2015/0012154 A1* | 1/2015 | Senkel | B64D 17/80 701/4 |
| 2015/0217862 A1 | 8/2015 | Dijaux | |
| 2015/0314831 A1 | 11/2015 | Jackson | |
| 2016/0032895 A1* | 2/2016 | Weddendorf | F03D 5/00 244/17.23 |
| 2016/0059958 A1 | 3/2016 | Kvitnevskiy | |
| 2016/0207368 A1* | 7/2016 | Gaonjur | B60F 5/02 |
| 2016/0207625 A1* | 7/2016 | Judas | B64C 29/0025 |
| 2016/0311526 A1* | 10/2016 | Geise | B64C 27/08 |
| 2016/0375982 A1* | 12/2016 | Rifenburgh | B64C 13/04 244/17.19 |
| 2017/0043866 A1 | 2/2017 | Sakurai | |
| 2017/0158342 A1* | 6/2017 | Ishii | B64D 31/10 |
| 2017/0174335 A1* | 6/2017 | Malloy | B64C 27/08 |
| 2017/0183088 A1* | 6/2017 | Du | B64C 25/06 |
| 2017/0197710 A1* | 7/2017 | Ma | G05D 1/0676 |
| 2017/0199527 A1* | 7/2017 | Chandra | G05D 1/0808 |
| 2017/0210486 A1* | 7/2017 | O'Brien | B64D 47/08 |
| 2017/0247107 A1* | 8/2017 | Hauer | B64C 39/024 |
| 2017/0247113 A1* | 8/2017 | Sanlaville | B64C 27/08 |
| 2017/0253331 A1* | 9/2017 | Nakashima | B64C 27/08 |
| 2017/0253333 A1 | 9/2017 | Baudet | |
| 2017/0269609 A1* | 9/2017 | Bradlow | G05D 1/102 |
| 2017/0283048 A1* | 10/2017 | Beckman | B64C 27/24 |
| 2018/0002001 A1 | 1/2018 | Daniel, Sr. | |
| 2018/0057152 A1 | 3/2018 | Reichert | |
| 2018/0117980 A1 | 5/2018 | Lacaze | |

* cited by examiner

MULTICOPTER WITH WIDE SPAN ROTOR CONFIGURATION

BACKGROUND OF THE INVENTION

Small scale, lightweight, and personal aircraft have been described. For example, some have imagined small aircraft used routinely for personal transportation, such as to get to and from work or school, and/or for entertainment. The ability to store and/or transport a personal aircraft may become a design consideration. For example, a personal aircraft may need to be transported by ground, e.g., in a trailer or on a truck bed, to be taken to a location from which the aircraft can safely take off and land.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multicopter aircraft is disclosed. The multicopter comprises a fuselage and a plurality of rotors. The plurality of rotors comprise inner rotors and outer rotors. The inner rotors are substantially surrounded by one or more other rotors, the fuselage, or a combination of one or more other rotors and the fuselage. In some embodiments, the inner rotors are tilted.

In some embodiments the rotors are tilted in various positions to enable efficient flight of the multicopter, for example to decrease drag or increase torque. In some embodiments, the multicopter comprises a wide span rotor configuration. The multicopter may comprise ten rotors. The multicopter may be driven using the one or more inner rotors before taking flight. Inner rotors alone may be utilized while the multicopter is flown close to a ground surface as a safety feature.

Figure 1:
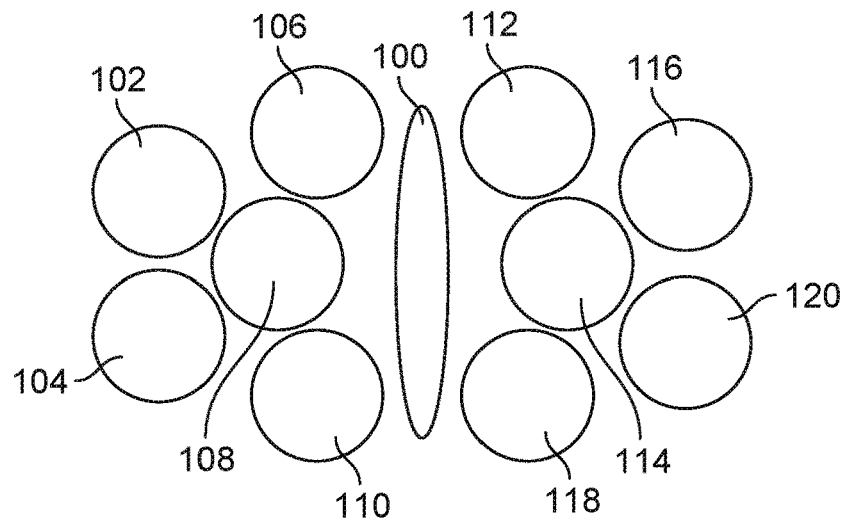
FIG. 1 is a diagram illustrating an embodiment of a multicopter with wide span rotor configuration.

FIG. 1 is a diagram illustrating an embodiment of a multicopter with wide span rotor configuration. In the example shown, the multicopter comprises three rotors adjacent to a side of the fuselage and two rotors adjacent to the three rotors and three rotors adjacent to an opposite side of the fuselage and two rotors adjacent to the three rotors adjacent to the opposite side of the fuselage. Rotors 106, 108, and 110 are adjacent to fuselage 100; rotors 102 and 104 are adjacent to rotors 106, 108, and 110. Rotors 112, 114, and 118 are adjacent to the opposite side of fuselage 100; rotors 116 and 120 are adjacent to rotors 112, 114, and 118.

In some embodiments, the one or more inner rotors of the multicopter comprise a middle rotor of the three rotors adjacent to the side of the fuselage and a middle rotor of the three rotors adjacent to the opposite side of the fuselage. For example, rotors 108 and 114 are inner rotors whereas the remaining rotors are outer rotors. In some embodiments, the one or more inner rotors of the multicopter comprise rotors that are substantially surrounded by other components of the aircraft. For example, inner rotor 108 is surrounded by fuselage 100 and rotors 110, 104, 102, and 106. Inner rotor 114 is surrounded by fuselage 100 and rotors 112, 116, 120, and 118. In some embodiments, an inner rotor includes a rotor that does not contribute to the perimeter of the aircraft. Outer rotors 106, 102, 104, 110, 112, 116, 120, and 118 are situated around the perimeter of the aircraft. An inner rotor may include a rotor that has a blade that cannot come in contact with an external body to the aircraft that is not directly above or below the aircraft. In various embodiments, the multicopter may comprise 2, 4, 6, or any appropriate number of inner rotors. The number of outer rotors the multicopter comprises may increase proportionally with the number of inner rotors.

In some embodiments, the one or more inner rotors and the outer rotors are arranged for maximum disc area and maximum wing span. In some embodiments, the multicopter has a width to length ratio ranging from 1.7 to 3. In some embodiments, the multicopter has a length of 88 inches or less. The multicopter may be designed to fit in a standard trailer. Dimensions of the multicopter may be constrained by the dimensions of a standard trailer. The length of the multicopter may be constrained by the width of a standard trailer and the width of the multicopter may be constrained by the length of a standard trailer. For example, the multicopter may be designed to fit in a trailer wherein the multicopter is inserted sideways. In some embodiments, the dimensions of the multicopter allow it to be transported easily in the event it is not flown and the multicopter cannot mobilize itself while landed. The multicopter may be optimized for over-water flight and have flotation devices in lieu of wheels, leaving it difficult to transport over land.

In some embodiments, using ten rotors maximizes the aircraft's disc area within the desired dimensions. The number of rotors may be determined in order to maximize disc area while maintaining redundancy of the aircraft. Using a large number of rotors such a ten may allow the multicopter to maintain flight in the event of rotor failure or allow for precision in control of the aircraft. A rotor failure may require power to be cut to a rotor opposite the failed rotor in order to level the aircraft. In some embodiments, the ten rotors in the example shown have enough power to maintain level flight of the aircraft in the event a rotor malfunctions or two rotors are not utilized. In some embodiments, the rotors have a diameter of 50 inches. The rotors may have the largest diameters possible within the constraints of the multicopter dimensions and having ten rotors. In some embodiments, the multicopter weighs 250 pounds or less. The multicopter may qualify as an ultralight aircraft under federal aviation regulation guidelines.

Rotors adjacent to the fuselage may be positioned at varying distances from the fuselage. Rotors adjacent to a same side of the fuselage may not be aligned. In the example shown, inner rotors 108 and 114 are further from fuselage 100 than outer rotors 106, 110, 112, and 118. Rotors adjacent to the fuselage may be arranged in a roughly elliptical position around the fuselage. In some embodiments, the multicopter is bilaterally symmetric.

The distance between rotors may vary. Rotors may be spaced apart in order to increase wing span of the aircraft. Rotors may be positioned close together or tips of the one or more inner rotors and the other rotors are overlapped. The rotors may be overlapped to improve efficiency of flight. In some embodiments, the rotors are positioned close to each other in order to minimize aircraft length or are spaced apart in order to increase aircraft width. The rotors may act like wings in forward flight of the aircraft. Positioning the rotors such that the aircraft has a large span may introduce fresh air to the rotors, increasing the efficiency of the aircraft.

Figure 2A:
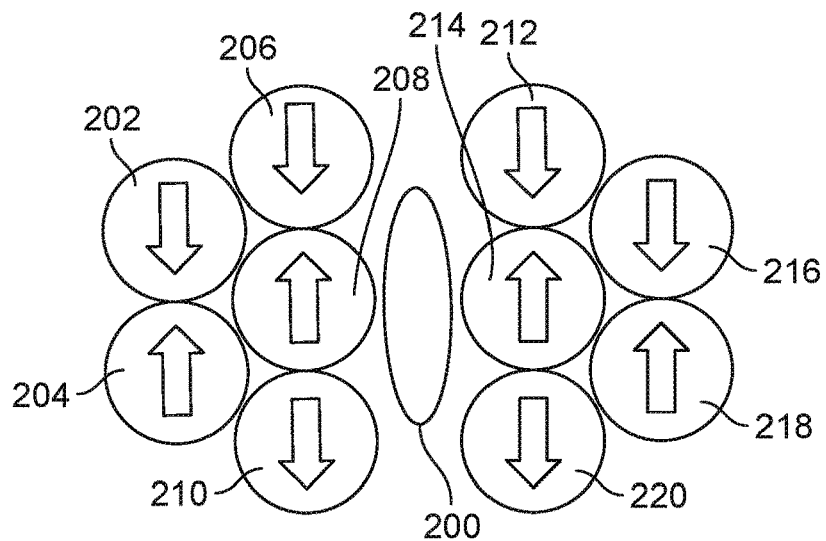
FIG. 2A is a diagram illustrating a rotor orientation of an embodiment of a multicopter with wide span rotor configuration.

FIG. 2A is a diagram illustrating a rotor orientation of an embodiment of a multicopter with wide span rotor configuration. In some embodiments, the one or more inner rotors and the other rotors rotate in differing planes. For example, the rotors may not be level. Rotors may be mounted at different heights on the aircraft. The rotors may be mounted at various heights in order to prevent rotor collisions. Rotors may be mounted such that they are tilted at varying angles. In some embodiments, one or more inner rotors are tilted forwards. In some embodiments, four rotors closest to the front of the multicopter are tilted backwards, four rotors adjacent to the four rotors closest to the front of the multicopter are tilted forwards, and two rotors closest to the back of the multicopter are tilted backwards. In the example shown, the multicopter comprises fuselage 200. In some embodiments, rotors 206 and 212 are the aircraft's two front facing rotors. Rotors 206 and 212 are tilted backwards. Rotors 202, 208, 214, and 218 are tilted forwards. Rotors 210 and 220 are tilted backwards.

In some embodiments, rotors that are tilted backwards rotate towards the fuselage of the aircraft and rotors that are tilted forwards rotate away from the fuselage. Rotors 206, 202, 210, 214, and 218 may rotate to the right in the example shown. Rotors 204, 208, 212, 220, and 216 may rotate to the left. The direction that rotors rotate in or are tilted may be determined in a way such that the aircraft's direction can be changed without large changes in throttle. Rotors opposite each other on the aircraft may rotate in opposing directions to balance torque. A rotor may rotate in an opposite direction from rotors adjacent to the rotor in cardinal directions from the rotor.

Figure 2B:
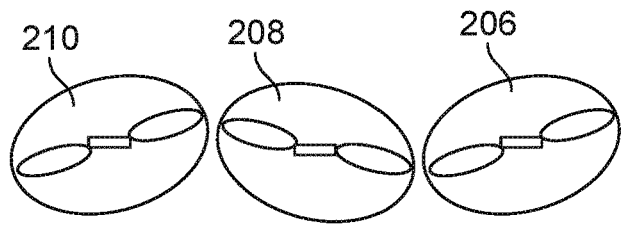
FIG. 2B is a diagram illustrating a rotor orientation of an embodiment of a multicopter with wide span rotor configuration.

FIG. 2B is a diagram illustrating a rotor orientation of an embodiment of a multicopter with wide span rotor configuration. In some embodiments, rotors 206, 208, and 210 are a side view of rotors 206, 208, and 210 of FIG. 2A. In the example shown, rotors 206 and 210 are tilted backwards and rotor 208 is tilted forwards. Rotors 206 and 210 are tilted such that they pivot up at the front facing end of the rotors (i.e. are tilted backwards). Rotor 208 pitches down in the direction of forward flight of the aircraft.

In some embodiments, the rotors are positioned such that from a lengthwise view of the multicopter, the rotors alternate in the direction they are angled. For example, rotors that are adjacent to a same side of the multicopter are alternatively pitched up or down. In some embodiments, alternating the direction the rotors are angled in enhances stability of the aircraft.

In some embodiments, the rotors are angled at a range from 5 to 10 degrees. In some embodiments, the angle of a rotor is determined based on energy conservation, maximizing forward force, and/or maintaining downwards force of the aircraft. A rotor that is angled too far may result in air being pushed to the sides of the multicopter rather than down, causing the aircraft to waste energy in hovering. In some embodiments, the angles at which rotors are positioned are determined based on simulations. In various embodiments, all rotors are tilted by the same degree or the rotors are tilted at varying angles.

In some embodiments, the multiple rotors are angled to enhance torque in directional flight. The rotors may be angled to attain greater yaw authority or increased torque. In some embodiments, rotors that are tilted forwards allow the aircraft to fly forward efficiently. Tilting the rotors forward may decrease the amount the aircraft must pitch forward in order to fly forward. Tilting the rotors forward may decrease the amount of drag the aircraft experiences or allow the aircraft to use less power. Tilting the rotors backwards may allow the aircraft to fly efficiently backwards. In some embodiments, the number of rotors tilted backwards is equal to the number of rotors tilted forwards. The angle of the rotors may be determined in order to maintain that the multicopter is level during flight. Power delivered to the rotors may be adjusted to maintain level or efficient flight of the aircraft. In some embodiments, rotors that are tilted backwards are throttled down when the aircraft engages in forward flight. A subset of rotors that are tilted backwards may be throttled down. For example, rotors 202, 206, 212, and 216 may be throttled down when the multicopter engages in forward flight.

In some embodiments, the rotors are positioned such that from a lengthwise view of the multicopter, the rotors alternate in the direction they spin. For example, rotors that are adjacent to a same side of the multicopter alternatively spin left or right. For example, rotors 206 and 210 may spin left while rotor 208 spins right. Alternating the direction rotors spin in may allow the aircraft to fly more efficiently. A rotor creates lift when the blade is traveling against the direction of wind and does not create lift when it spins in the direction of wind. By stacking up alternating rotors one behind the next in the direction of flight, the aircraft may experience a consistent amount of lift or decrease intervals of decreased lift.

Figure 3:
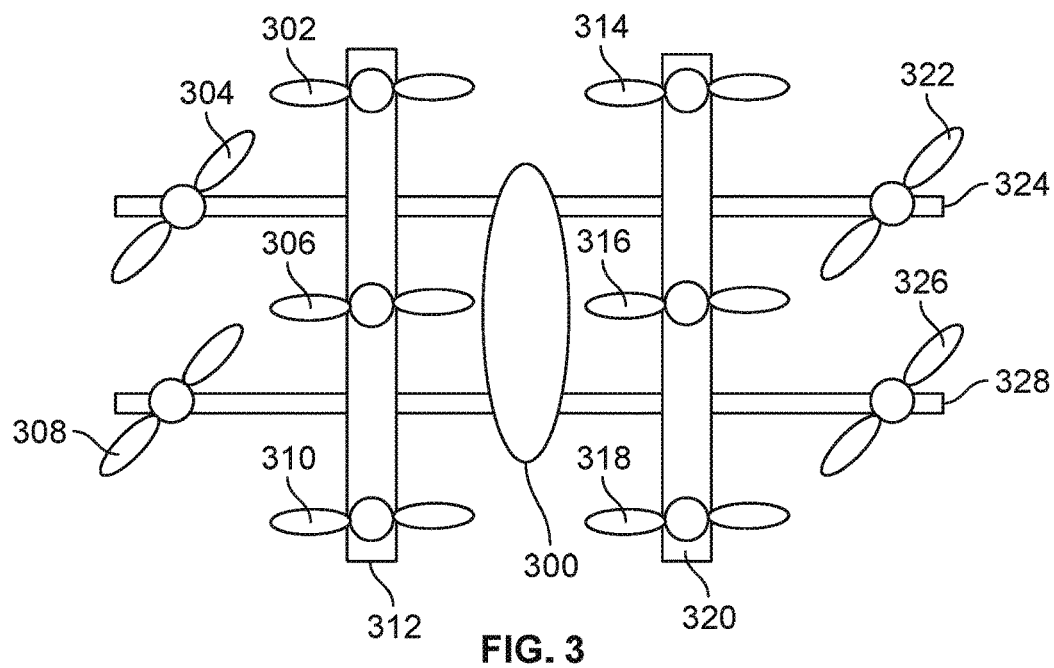
FIG. 3 is a diagram illustrating an embodiment of a multicopter with wide span rotor configuration.

FIG. 3 is a diagram illustrating an embodiment of a multicopter with wide span rotor configuration. In some embodiments, the multicopter is optimized to fly over water. In some embodiments, the multicopter includes flotation devices. The flotation devices may be attached on either side of the fuselage. In some embodiments, the multicopter comprises two flotation devices that are positioned far apart. Positioning the flotation devices in a wide stance may increase stability of the aircraft or prevent the aircraft from flipping in the event the aircraft lands at an angle. In some embodiments, rotors are attached to the flotation devices.

Rotors 302, 206, and 310 are attached to flotation device 312 in the example shown. Rotors 314, 316, and 318 are attached to flotation device 320. Flotation devices 312 and 320 are on either side of fuselage 300. In the example shown, supports 324 and 328 are positioned perpendicular to the flotation devices. Rotors 322 and 304 are attached at either end of support 324. Rotors 308 and 328 are attached at either end of support 328. In some embodiments, supports 324 and 328 pass through flotation device 320, fuselage 300, and flotation device 312. For example, flotation device 320 may have a hole where support 328 passes through. The hole may be sealed in order to be watertight and airtight. In some embodiments, supports 324 and 328 do not pass through fuselage 300. The fuselage may have separate supports that attach on either side. In some embodiments, in lieu of support 328 four separate supports may be used. In various embodiments, supports 324 and 328 are rectangular prisms, rods, or any other appropriately shaped support. Supports 324 and 328 may be designed to securely support the weight of rotors 304, 322, 308, and 328. The supports may be lightweight. The supports may be rigid, resistant to torsion, or able to withstand high winds and inclement weather conditions.

In some embodiments, multiple batteries are stored in or attached to the flotation devices. The batteries may be used to power the aircraft. In some embodiments, the majority of the weight of aircraft is due to batteries. For example, the aircraft may comprise 120 pounds of batteries out of an overall weight of 250 pounds. Storing the batteries in the flotation devices may allow the aircraft to have a low center of gravity, providing stability to the aircraft when it is on water. In some embodiments, the batteries are close to the rotors due to their placement in the flotation devices. Having batteries close to the rotors may allow for close cable runs, which allows motors of the aircraft to be easily controlled. Placing batteries close to the rotors may limit resistance caused by wires. Storing the batteries in the flotation devices keeps them away from the fuselage of the aircraft. In some embodiments, the batteries are a fire hazard that poses a danger to a pilot situated in the fuselage.

In some embodiments, the aircraft is designed to rest atop water via the flotation devices when it is not flown. In some embodiments, the multicopter can be driven on a body of water by powering a subset of the motors of the multicopter. In some embodiments, the multicopter is able to be driven by the one or more inner rotors. One or more inner rotors that are pitched forward may allow the aircraft to move forward. The aircraft may have a portion of the flotation devices immersed when the aircraft is at rest in water. The aircraft may be able to be driven across water without hovering over the water.

In some embodiments, the inner rotors are not accessible to a person or obstacle approaching the multicopter in a typical way (e.g. from a direction that is not directly above or below the aircraft). The multicopter may be driven using inner rotors alone until the multicopter is a position deemed safe for lift off. In some embodiments, the multicopter engages all of the motors and takes flight when it is determined to be safe. For example, the multicopter may include sensors that determine whether obstacles are nearby. In the event that obstacles are nearby, the multicopter may be driven using the inner rotors until the sensors indicate the location is clear. The ability to be driven using inner rotors may ensure safety or integrity of a pilot, the multicopter, or surrounding entities.

In some embodiments, the inner rotors alone are used to hover the multicopter. In some embodiments, the inner rotors alone are powered in order to conduct electricity for the aircraft. The inner rotors may not be tilted. In some embodiments, outer rotors or other rotors of the aircraft are not tilted. Instead, rotors are throttled up or down to navigate the aircraft. In some embodiments, the multicopter uses the inner rotors to accomplish tasks without introducing safety hazards.

In some embodiments, the aircraft is designed for flight over land. In some embodiments, 312 and 320 are support structures rather than flotation devices. Support structures 312 and 320 may have wheels attached underneath them to move the aircraft on land. Components that aid is landing may be included in supports 312 and 320 or attached to them, for example springs or load absorbing materials. In some embodiments, the aircraft comprises floatation devices and wheels.

Figure 4:
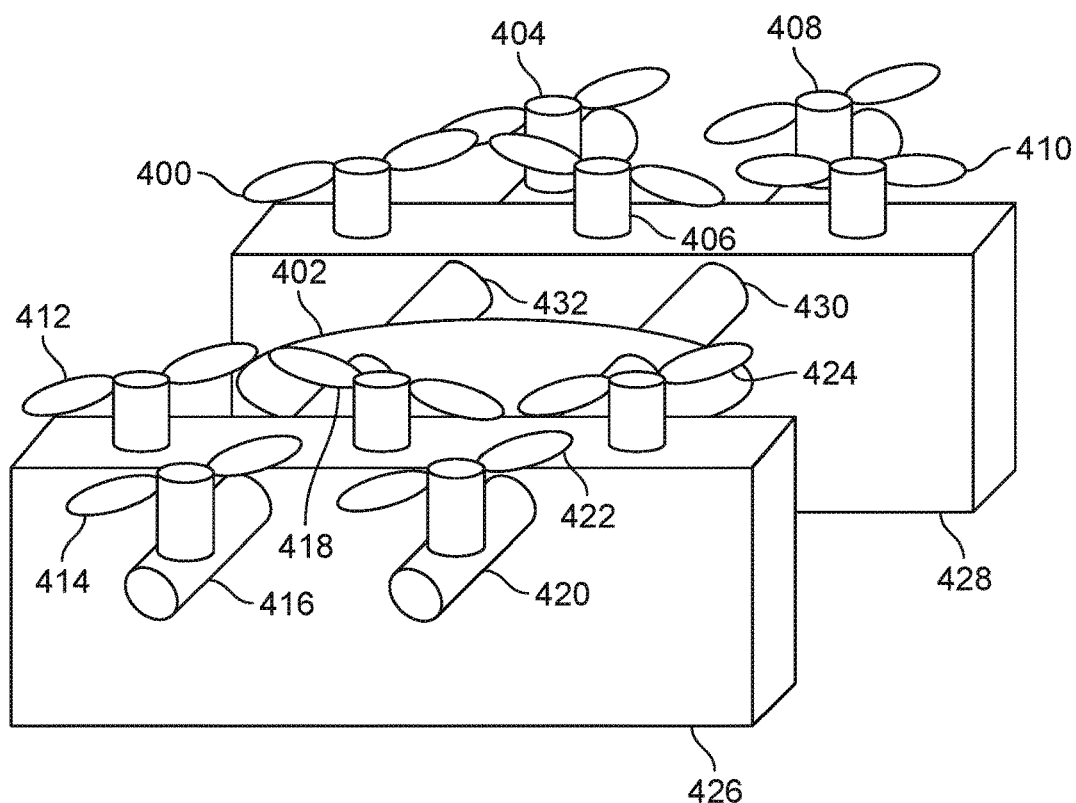
FIG. 4 is a diagram illustrating a side view of an embodiment of a multicopter with wide span rotor configuration.

FIG. 4 is a diagram illustrating a side view of an embodiment of a multicopter with wide span rotor configuration. In the example shown, the aircraft is optimized for landing on water. The multicopter comprises fuselage 402. Supports 416, 420, 432, and 430 are attached to fuselage 402. Supports 416 and 420 are attached to flotation device 426. Supports 432 and 430 are attached to flotation device 428. Rotors 412, 416, and 424 are attached on top of flotation device 426. Rotors 400, 406, and 410 are attached on top of flotation device 428. Rotor 414 is attached on top of support 416, rotor 422 is attached on top of support 420, rotor 404 is attached on top of support 432, and rotor 408 is attached on top of support 430.

In some embodiments, a height of the flotation devices is greater than a width of the flotation devices. In the example shown, flotation devices 426 and 428 are thin and tall in shape. A large percentage of the flotation devices may be submerged underwater when the aircraft is at rest on water. The height of the flotation devices may ensure the rotors or a pilot of the aircraft stay dry. In some embodiments, components of the multicopter are treated to be waterproof or water resistant. In some embodiments, fuselage 402 is partially submerged in water when the aircraft is at rest on water. Flotation devices 426 and 428 may be inflated with air. Flotation devices 426 and 428 may have bottoms made of a thick or robust material such that the multicopter can be landed on rough terrain or surfaces other than water. In some embodiments, the flotation devices are curved. The flotation devices may be curved to increase stability during water landings.

Figure 5:
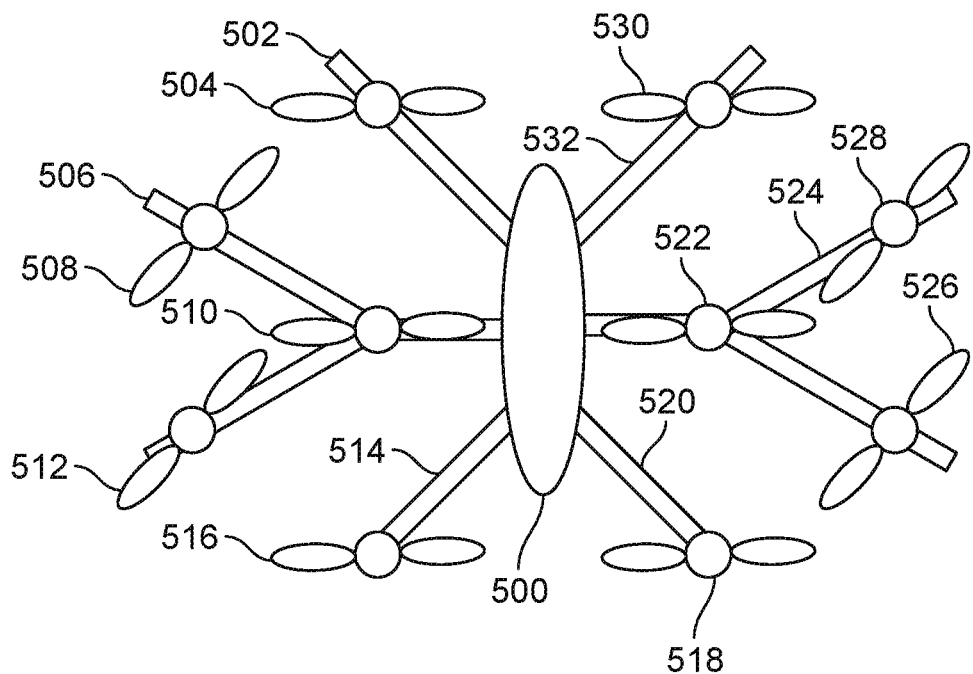
FIG. 5 is a diagram illustrating an embodiment of a multicopter with wide span rotor configuration.

FIG. 5 is a diagram illustrating an embodiment of a multicopter with wide span rotor configuration. In the example shown, struts 502, 532, 514, and 520 extend from fuselage 500 in an 'X' configuration. Struts 506 and 524 extend from either side of fuselage 500 both respectively in sideways "Y" configurations wherein the stem of the "Y" is attached to the fuselage. Rotors 508, 510, and 512 are positioned on top of 506. Rotors 528, 526, and 522 are positioned on top of strut 524. Rotor 504 is positioned on top of strut 502, rotor 530 is positioned on top of strut 532, rotor 516 is positioned on top of strut 514, and rotor 518 is positioned on top of strut 520. In the example shown, the rotors are positioned similarly to the rotors of FIG. 4. However, the rotors are attached to a different formation of supports. In various embodiments, the strut or support formation varies widely. The support configuration may be determined based on weight restraints, aircraft stability, battery storage, aerodynamics, or any other appropriate constraint. In the example shown, the struts may all be flotation devices designed to keep the multicopter afloat when it lands on water. Flotation devices may be attached underneath the struts. Wheels may be attached underneath the struts.

Figure 6A:
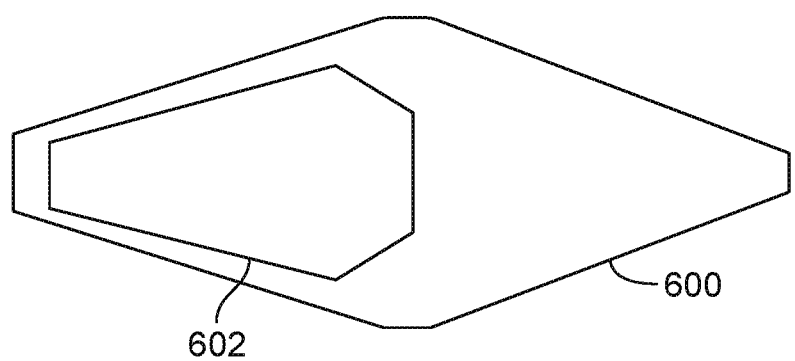
FIG. 6A is a diagram illustrating an embodiment of a fuselage of a multicopter with wide span rotor configuration.

FIG. 6A is a diagram illustrating an embodiment of a fuselage of a multicopter with wide span rotor configuration. In some embodiments, the fuselage comprises an enclosed cabin. The cabin be designed for a pilot to be seated inside. In the example shown, fuselage 600 has window 602. Window 602 may allow a pilot visibility. The fuselage may protect a pilot from coming in contact with the rotors in event of an emergency. A pilot may be strapped into the fuselage in a recumbent position such that the pilot cannot personally touch the rotors of the multicopter. A pilot strapped into an enclosed fuselage may be capable of taking more load in an accident than a pilot riding on top of an open fuselage. In some embodiments, the fuselage has a steering mechanism. In some embodiments, the multicopter has a flight computer. For example, the flight computer may use ultrasound signals to determine whether obstacles are nearby and prevent flight in the event obstacles are present. Fuselage 600 has tapered ends and may be designed to be aerodynamic.

Figure 6B:
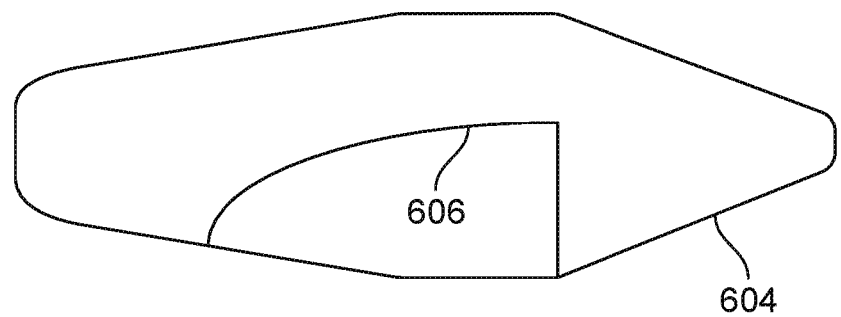
FIG. 6B is a diagram illustrating an embodiment of a fuselage of a multicopter with wide span rotor configuration.

FIG. 6B is a diagram illustrating an embodiment of a fuselage of a multicopter with wide span rotor configuration. In the example shown, fuselage 604 has door 606. Door 606 may be used by a pilot to enter the fuselage. The door may be anywhere on the fuselage. Fuselage 604 has a boxy front. In various embodiments, the fuselage is a variety of shapes and sizes. The fuselage may be designed to protect a pilot from water. The fuselage may be rigid and resistant to torsion. The fuselage may comprise safety elements such as a seatbelt that turns off power to the aircraft in the event the seatbelt is pulled out from the seat.

Figure 6C:
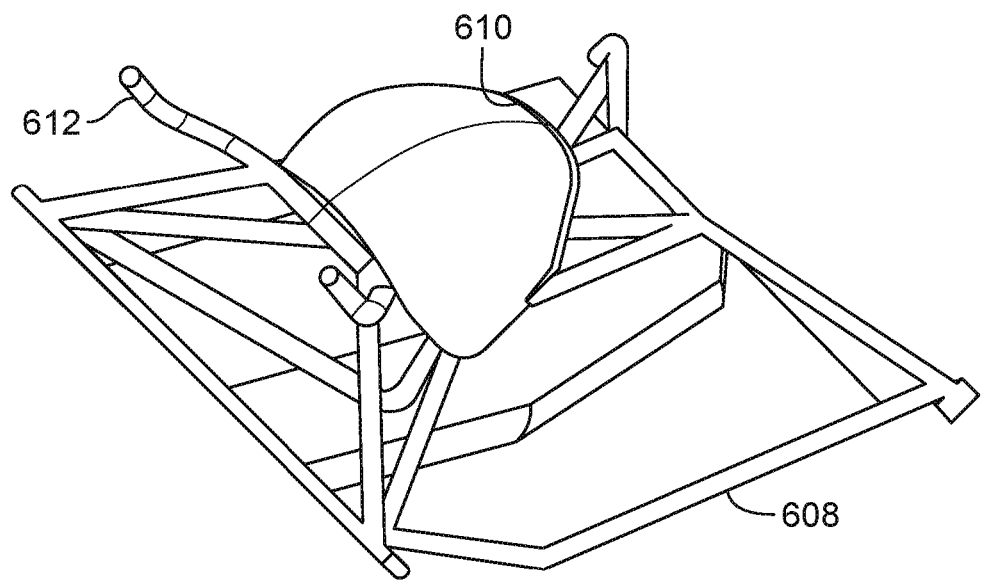
FIG. 6C is a diagram illustrating an embodiment of a fuselage of a multicopter with wide span rotor configuration.

FIG. 6C is a diagram illustrating an embodiment of a fuselage of a multicopter with wide span rotor configuration. In the example shown, the fuselage is not enclosed. Seat 610 is designed for a pilot to sit atop it and grasp handlebars 612. Structure 608 may enable the fuselage to be easily mounted to other supports that have attached rotors.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A multicopter comprising:
a fuselage and a plurality of rotors,
wherein the plurality of rotors comprises inner rotors and outer rotors, and
wherein the inner rotors are substantially surrounded by one or more other rotors, the fuselage, or a combination of one or more other rotors and the fuselage; and
wherein the plurality of rotors are arranged to provide an overall width to length ratio ranging from 1.7 to 3 for the multicopter and the multicopter has a length of 88 inches or less.

2. The multicopter of claim 1, wherein the inner rotors are tilted.

3. The multicopter of claim 1, comprising a wide span rotor configuration.

4. The multicopter of claim 1, comprising ten rotors.

5. The multicopter of claim 1, comprising three rotors adjacent to a side of the fuselage, two rotors adjacent to the three rotors, three rotors adjacent to an opposite side of the fuselage, and two rotors adjacent to the three rotors adjacent to the opposite side of the fuselage.

6. The multicopter of claim 4, wherein the inner rotors comprise a middle rotor of the three rotors adjacent to the side of the fuselage and a middle rotor of the three rotors adjacent to the opposite side of the fuselage.

7. The multicopter of claim 1, wherein the inner rotors and the outer rotors are arranged for maximum disc area and maximum wing span.

8. The multicopter of claim 1, wherein the multicopter is optimized to fly over water.

9. The multicopter of claim 8, wherein flotation devices are attached on either side of the fuselage.

10. The multicopter of claim 8, wherein rotors are attached to the flotation devices.

11. The multicopter of claim 8, wherein a height of the flotation devices is greater than a width of the flotation devices.

12. The multicopter of claim 1, wherein the multicopter is able to be driven by the inner rotors.

13. The multicopter of claim 1, wherein the inner rotors are tilted forwards.

14. The multicopter of claim 1, wherein the inner rotors and the outer rotors rotate in differing planes.

15. The multicopter of claim 1, wherein the tips of the inner rotors and the outer rotors are overlapped.

16. The multicopter of claim 1, wherein four rotors closest to the front of the multicopter are tilted backwards, four rotors adjacent to the four rotors closest to the front of the multicopter are tilted forwards, and two rotors closest to the back of the multicopter are tilted backwards.

17. The multicopter of claim 1, wherein the fuselage comprises an enclosed cabin.

18. The multicopter of claim 1, comprising a steering mechanism.

* * * * *